United States Patent [19]

Fassbender

[11] Patent Number: 4,798,256

[45] Date of Patent: Jan. 17, 1989

[54] HYDROSTATIC AUXILIARY STEERING DEVICE

[75] Inventor: Rolf Fassbender, Mutlangen, Fed. Rep. of Germany

[73] Assignee: Zahnradfabrik Friedrichshafen, AG., Friedrichshafen, Fed. Rep. of Germany

[21] Appl. No.: 111,820

[22] Filed: Oct. 23, 1987

[30] Foreign Application Priority Data

Nov. 11, 1986 [EP] European Pat. Off. ............ PCT/EP86/00647

[51] Int. Cl.⁴ .................................. B62D 5/08
[52] U.S. Cl. .......................... 180/133; 180/132; 180/141
[58] Field of Search .............. 180/132, 133, 141; 60/384, 421; 91/6, 516

[56] References Cited

U.S. PATENT DOCUMENTS

| | | | |
|---|---|---|---|
| 4,043,419 | 8/1977 | Larson et al. | 180/132 |
| 4,174,018 | 11/1979 | Liebert et al. | 180/132 |
| 4,553,389 | 11/1985 | Tischer | 180/132 |
| 4,618,017 | 10/1986 | Liebert et al. | 180/133 |

Primary Examiner—David M. Mitchell
Assistant Examiner—Donn McGiehan
Attorney, Agent, or Firm—Albert M. Zalkind

[57] ABSTRACT

A pair of flow restricting orifices regulate flow from a main engine driven pump through a control valve and steering wheel metering device to a servo motor in a vehicle steering system. Under emergency conditions, an additional flow restricting orifice connects the downstream side of one of the aforementioned pair of orifices to a flow dividing valve. The flow dividing valve connects a reserve pump in parallel with the main pump to augment the supply of pressure medium and sustain a minimal operational steering speed under control of the differential pressure across the other of the pair of orifices, which then dominates control of the supply of pressure medium to the servo motor through the additional flow restricting orifice while there is no flow through said one of the pair of orifices.

3 Claims, 3 Drawing Sheets

HYDROSTATIC AUXILIARY STEERING DEVICE

BACKGROUND OF THE INVENTION

The present invention relates to a hydrostatic steering system for motor vehicles.

Vehicle steering apparatus of the type to which the present invention relates, is generally known as disclosed for example in U.S. Pat. No. 4,553,389 to Tischer et al. In such steering apparatus, a controlling pump and/or a flow dividing valve supplies pressure medium to a steering servo motor for meeting instantaneous steering requirements. The demand for pressure medium is signaled by a differential pressure across a metering orifice that regulates the supply of the pressure medium. The pressure supply in such prior art systems is such that the differential pressure at the metering orifice not only breaks down when the main pump goes out of action, but also when the main pump is intact and the steering speed is so high as to require the entire output of the main pump for steering purposes, under engine idling conditions for example. Under such an operating situation, involving rapid steering movements under engine idling conditions, a reserve pump is utilized to augment the main pump output. However, under slow vehicle travel conditions, the reserve pump customarily driven by the vehicle wheels cannot satisfy the demand for flow of pressure medium. Excessive wear of the reserve pump therefore results from the pump acceleration effort encountered.

It is therefore a basic object of the present invention to eliminate the aforementioned disadvantages of known hydrostatic auxiliary steering apparatus and to improve the same in such a manner that the reserve pump is only enabled and loaded when a specific minimal steering speed cannot otherwise be achieved with the flow from the main pump.

SUMMARY OF THE INVENTION

In accordance with the present invention, a metering unit driven by the vehicle steering wheel is connected to a control valve for controlling pressurization of the steering servo motor. A first metering orifice regulates flow from a main engine driven pump to the metering unit through the control valve. A second vehicle driven pump may be connected in parallel with the first pump to the control valve through a flow dividing valve. A second metering orifice is located between the first pump and the metering unit, and is interconnected with the first metering orifice downstream of the pump by a connecting line having a third or additional metering orifice and a check valve therein through which the pressure medium may flow in one direction from the downstream side of the second metering orifice. The flow dividing valve aforementioned is connected to the connecting line between the third metering orifice and the check valve so as to introduce pressure medium from the second pump only under emergency conditions in order to meet certain minimal steering speed demands incapable of being met by the output of the first pump.

The arrangement of additional orifices in the steering system as aforementioned, in accordance with the present invention enables satisfactory steering operation wherein the supply of pressure medium depends upon load, by introducing the output of the reserve pump only when the requirement of the steering servo motor for flow of pressure medium thereto in order to attain a minimal operational speed under emergency conditions, is not otherwise met.

BRIEF DESCRIPTION OF DRAWING FIGURES

These together with other objects and advantages which will become subsequently apparent reside in the arrangement and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
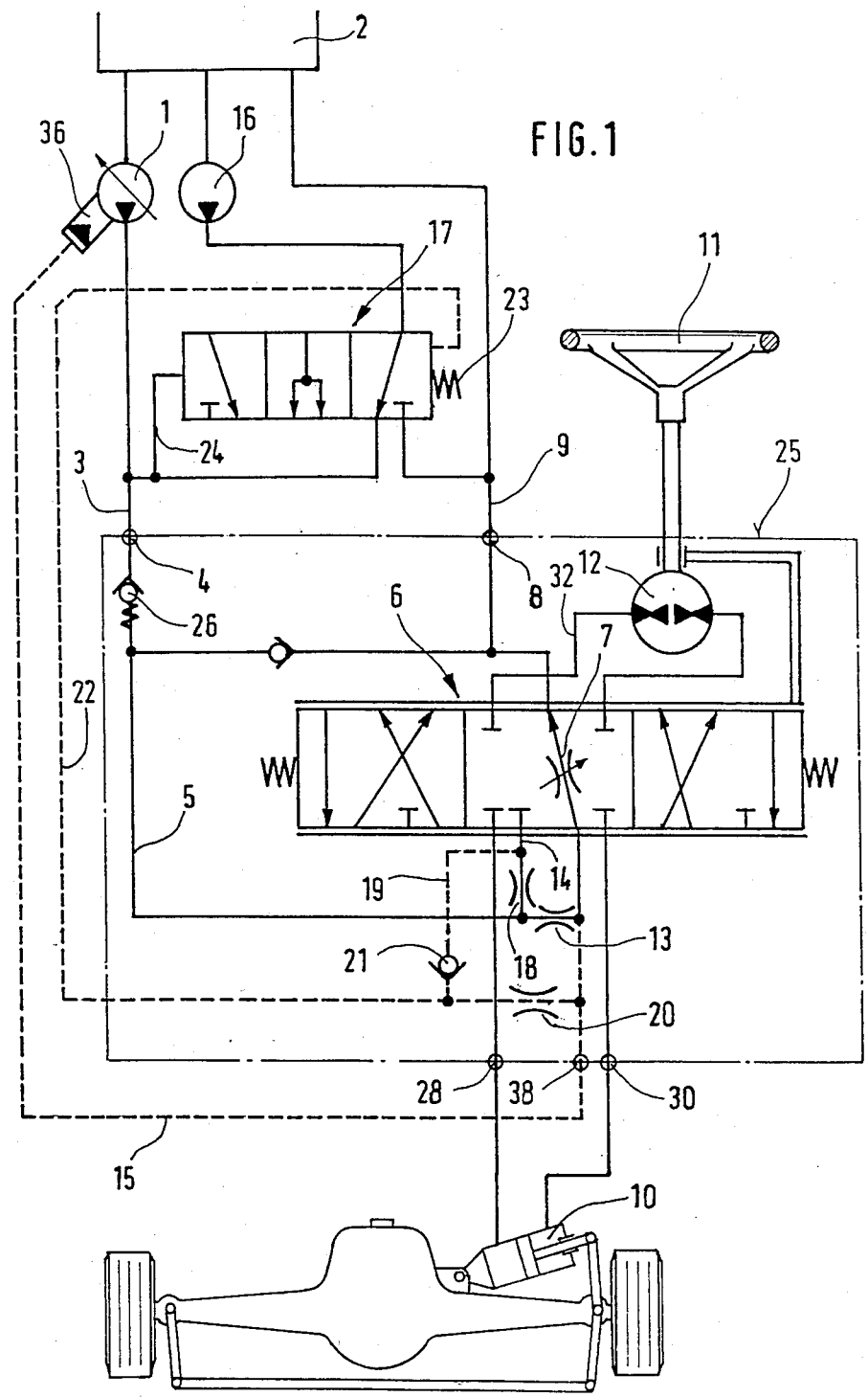
FIG. 1 is a fluid circuit diagram illustrating the hydrostatic auxiliary steering system of the present invention in accordance with one embodiment thereof.

In the embodiment shown in FIG. 1, a first high pressure pump 1 having a variable volumetric flow capacity, conveys pressure medium from a reservoir 2 through a pressure line 3 to a pressure port 4 of a control unit generally referred to by reference numeral 25. From port 4, the pressure medium flows through a check valve 26 and pressure supply passage 5 to a control valve generally referred to by reference numeral 6. The control valve 6 has a by-pass passage 7 formed therein by flow constricting control slots which are open in the neutral, middle position of the control valve as shown in FIG. 1, establishing a flow connection with the reservoir 2 through a return port 8 of unit 25 and a return line 9. A steering servo motor 10 is connected through ports 28 and 30 of control unit 25 to one side of the control valve 6. A metering unit 12 drivingly connected to a vehicle steering wheel 11, is connected through passages 32 and 34 to the other side of control valve 6. The steering wheel 11 is also mechanically connected to the control valve 6, as shown, as is already well known in the art.

A first metering orifice 13 having a constant flow-restricting cross sectional area, is located in the pressure supply passage 5 between the port 4 and the by-pass passage 7. A branch passage 14 extends from the pressure supply passage 5 upstream of the first metering orifice 13 to the control valve 6 and is blocked by the control valve in its neutral, middle position. As the control valve is displaced from its neutral position, the passage 14 is opened to correspondingly increase its cross sectional flow area until the fluid connection between the pressure supply passage 5 and one of the opposite ports 32 and 34 of the metering unit 12, acting as an intake, is fully opened.

In a similar manner, displacement of the control valve 6 from its neutral position to effect adjustment of operating pressure, correspondingly restricts the by-pass passage 7 to finally block flow therethrough. In such neutral, middle position of the control valve 6, flow to and from the steering servo motor 10 is also blocked. With increased displacement of the control valve 6 from its neutral position, the pressurized passage 32 or 34 from the metering unit 12, is connected with one chamber of the steering servo motor 10 to effect movement of the vehicle wheels to be steered. The other chamber of the steering servo motor 10, which is depressurized at that moment, is connected through control valve 6 and return line 9 to the reservoir 2.

In the direction of flow, downstream of the first metering orifice 13, a branch control line 15 extends from the pressure supply passage 5 to a volumetric flow adjusting device 36 associated with the first high pressure pump 1. A second high pressure pump 16 having a constant volumetric flow characteristic, is operatively interconnected in parallel with the first high pressure pump 1, through a flow dividing valve 17, with the pressure supply line 3 for pressurized flow through supply passage 5 upstream of the first metering orifice 13 in the embodiment shown in FIG. 1. In the neutral position of the control valve 6, flow from the second high pressure pump 16 is always conducted through the first metering orifice 13 to the by-pass passage 7. The pump 1 is customarily regulated to maintain a constant pressure drop across the metering orifice 13. The pressure downstream of the first metering orifice 13 is then communicated through port 38 of the control unit 25 and the control line 15 to the adjusting device 36 of the first high pressure pump 1 for regulation thereof. The first high pressure pump 1 is preferably driven by the motor vehicle driving engine. The second high pressure pump 16 is customarily driven by the vehicle wheels, so that its output is a function of vehicle speed.

A second metering orifice 18 is located in passage 14 extending from the supply passage 5 of the first high pressure pump 1 to the metering unit 12 through control valve 6. The downstream sides of the first and second metering orifices 13 and 18 are connected to each other by a connecting line 19. A third or additional metering orifice 20 is located in the connecting line 19 at the downstream side of the first metering orifice 13. Further, a check valve 21 through which the pressure medium is conducted from the downstream side of the second metering orifice 18, is located in the connecting line 19 between the third metering orifice 20 and the downstream side of the second metering orifice 18.

A control line 22 is connected to the connecting line 19 between the third metering orifice 20 and the check valve 21. Control line 22 extends to the flow dividing valve 17 for adjustment thereof. The pressure downstream of the first metering orifice 13 is thereby communicated through the third metering orifice 20 and the control line 22 to the flow dividing valve 17 for said adjustment.

The flow dividing valve 17 is a 3/3-channel valve, for example. In a first position of the flow dividing valve 17, under the bias of a spring 23, the second high pressure pump 16 is connected only to the pressure line 3. In addition to the force of the spring 23, the pressure from the control line 22 also urges the flow dividing valve 17 to such first position thereof while the pressure from a control line 24 connected to the pressure line 3 urges the flow dividing valve 17 in the opposite direction. With increasing pressure in the pressure line 3 and consequently in the control line 24, a second position of the flow dividing valve 17 may be established in which the flow from the second high pressure pump 16 is divided between pressure line 3 and return line 9. In response to further displacement of the flow dividing valve 17, a final position is reached in which the second high pressure pump 16 is connected only to the return line 9.

In the embodiment of FIG. 1, a sliding transition to the second high pressure pump 16 is effected when the first high pressure pump 1 is partially disabled. Furthermore, when the steering system is being operated exclusively by the second high pressure pump 16, the supply of pressure medium occurs in the same manner as the supply from the first high pressure pump 1, since the flow dividing valve 17 acts as a pump regulator.

Figure 2:
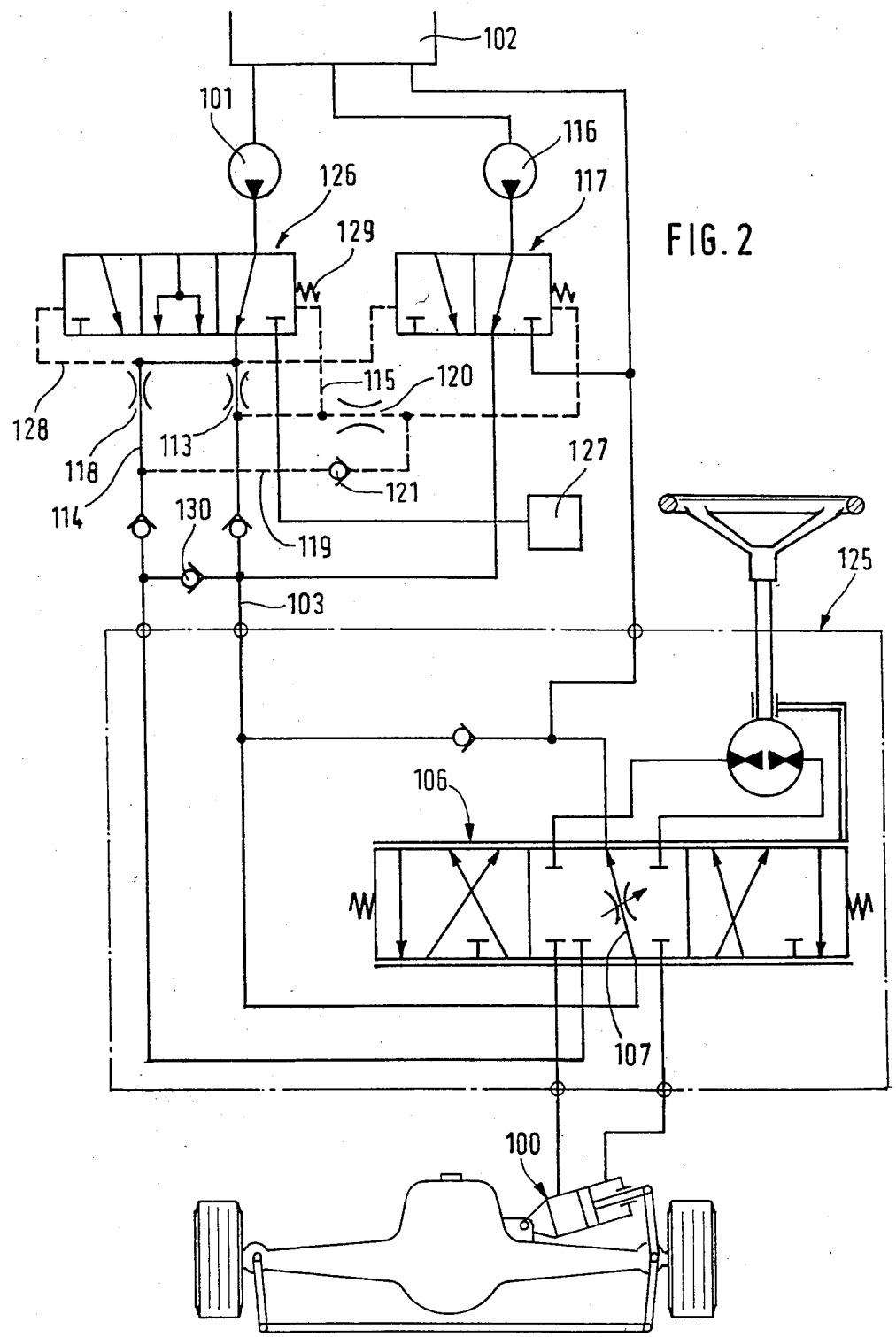
FIGS. 2 and 3 are fluid circuit diagrams, respectively illustrating the steering system of the present invention in accordanc with second and third embodiments.

The three metering orifices 13, 18 and 20, the control valve 6 and the metering unit 12 form the structural unit 25 in the embodiment of FIG. 1 as hereinbefore described. In the embodiment shown in FIG. 2, three corresponding metering orifices 113, 118 and 120 are located outside of a structural unit 125, which otherwise corresponds to the unit 25 of FIG. 1. Thus, unit 125 includes a control valve 106 having a by-pass passage 107 therein corresponding to the by-pass passage 7 of control valve 6 in FIG. 1. The first high pressure pump 101 shown in FIG. 2 is a constant-flow type, supplying the steering servo motor 100 with pressure medium to meet operating demands, with any excess being delivered to another pressure operated device 127 through a flow dividing valve 126. The first metering orifice 113 is located in the pressure line 103 extending from the flow dividing valve 126. The pressure medium upstream of the first metering orifice 113, is delivered to a first valve actuating control surface of the flow dividing valve 126 through a control line 128. The pressure medium at the downstream side of the first metering orifice 113 is delivered through the control line 115 to a second valve actuating control surface of the flow dividing valve 126 on which a spring 129 also acts. Upstream of the first metering orifice 113, a passage 114 branches off from the pressure line 103 and has a second metering orifice 118 located therein. A third metering orifice 120 and a check valve 121 are located in a connecting line 119 which extends between the downstream sides of the first and second metering orifices 113 and 118, as in the case of the embodiment shown in FIG. 1 hereinbefore described.

A flow dividing valve 117 associated with the second high pressure pump 116, is a 2/3 channel valve by virtue of which the steering servo motor 100 is supplied by the second high pressure pump 116 either partially to a limited extent or exclusively through the pressure supply line 103. Thus, under emergency steering conditions, there is a loss of operational ease as a sacrifice for the use of a simpler flow dividing valve 117. The piston surfaces and springs of the valves 126 and 117 are synchronized with each other in such a way that the second high pressure pump 116 draws pressure medium from the reservoir 102 when the supply from the high pressure pump 101 is such that the pressure drop across the first metering orifice 113 results in displacement of the flow dividing valve 126 against the bias of spring 129.

A check valve 130 located in the connecting line 119 between the pressure line 103 and the line 114 blocks flow of pressure medium from the line 114 to the pressure line 103 and to by-pass passage 107 of control valve 106 of the unit 125.

Figure 3:
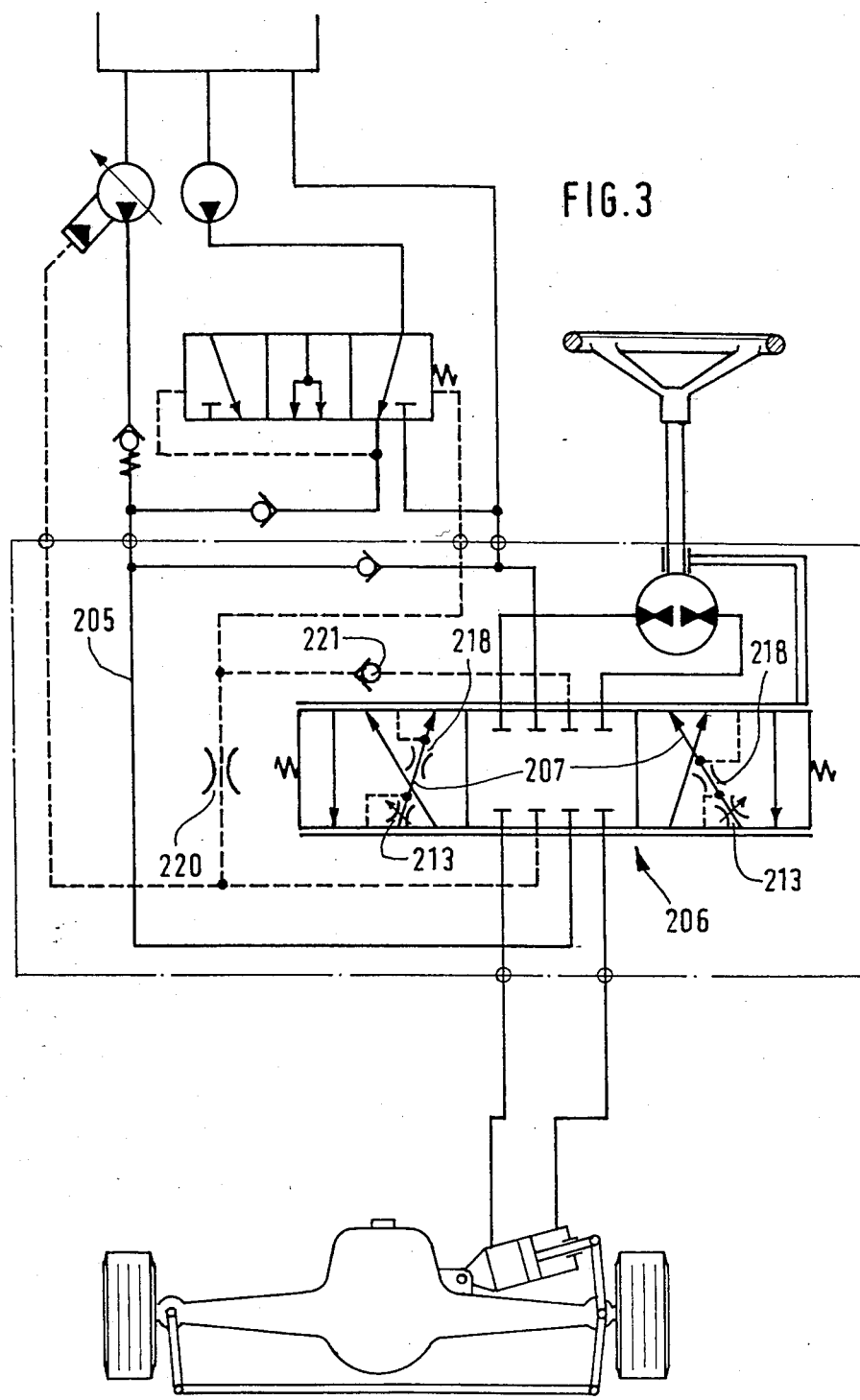

The embodiment shown in FIG. 3 varies essentially from the first two embodiments hereinbefore described with respect to FIGS. 1 and 2, in the provision of a first metering orifice 213 having a variable cross sectional flow area disposed in the control valve 206. In the neutral, middle position of the control valve 206, the cross sectional flow area of the first metering orifice 213 approaches zero so that by-pass passage 207 is almost completely blocked. In the final positions of the control valve 206, to which it is displaced from the neutral position, the first metering orifice 213 is fully opened in order to establish maximum operational steering speed. As a result, the pressure medium conveyed to the pressure supply passage 205 flows through the first metering orifice 213 without any drop in pressure. The pressure is only influenced by the second metering orifice 218. Otherwise, the arrangement of the FIG. 3 embodiment, including the third metering orifice 220 and the check valve 221, corresponds to the arrangement of orifices 20 and 21 of the embodiment shown in FIG. 1.

Operation of the auxiliary steering apparatus of the present invention will now be explained in greater detail with reference to the embodiment of FIG. 1. When the vehicle steering wheel 11 is turned so rapidly as to require maximum output flow from the first main pump 1 to the steering servo motor 10, the valve actuating piston of the control valve 6 is displaced from the neutral, middle position shown in FIG. 1 in a left or right hand direction to a final position. The by-pass passage 7 is thereby blocked so that no more pressure medium flows through the first metering orifice 13 and the differential pressure thereacross becomes zero. As a result, the pressure medium is then conveyed exclusively through the second metering orifice 18 to develop a pressure differential as an instantaneous function of steering speed. When the pressure differential across the first metering orifice 13 approaches zero, the pressure in line 3 becomes equal to the pressure in the control line 15. Under that condition, pressure medium flows through the second metering orifice 18 with the pressure in connecting line 19 lower than the pressure in lines 3 and 15 by an amount equal to the differential pressure across the second metering orifice 18. The control line 22 for controlling the connection of the second high pressure pump 16 through flow dividing valve 17, is connected to the control line 15 through the third metering orifice 20 and the connecting line 19 through the check valve 21. Since no pressure medium is then flowing through the first metering orifice 13, the differential pressure of the second metering orifice 18 prevails through the third metering orifice 20. In the foregoing situation, a small stream of pressure medium flows through the third metering orifice 20 and the check valve 21 to the connecting line 19. Consequently, the differential across the second metering orifice 18 dominates the pressure in supply passage 5, the pressure line 3 and the control line 22.

Utilizing the differential pressure across orifice 18 to control the flow dividing valve 17, the second high pressure pump 16 is connected only to the steering servo motor 10 in the absence of flow through the first metering orifice 13, corresponding to the operating condition in which total flow from the first high pressure pump 1 is required while the differential pressure across the second metering orifice 18 is insufficient to develop the necessary steering speed. The steering speed, below which the second high pressure pump 16 is connected to the steering servo motor when there is insufficient flow from the first high pressure pump 1, may be determined from the size of the second metering orifice 18. The check valve 21 serves the purpose of blocking flow between the pressure line 3 and the control line 22 when the differential pressure across the second metering orifice 18 is zero.

The embodiments shown in FIGS. 2 and 3 basically function in the same manner as hereinbefore described in connection with FIG. 1.

The foregoing is considered as illustrative only of the principles of the invention. Further since numerous modifications and changes will readily occur to those skilled in the art, it is not desired to limit the invention to the exact arrangement and operation shown and described, and, accordingly, all suitable modifications and equivalents may be resorted to, falling within the scope of the invention.

I claim:

1. In a hydrostatic auxiliary steering system for a motor vehicle having a steering wheel (11) and steerable wheels, a metering unit (12) driven by said steering wheel (11), control valve means (6) connected to the steering wheel for displacement from a neutral position in two manipulation directions when the steering wheel is turned, a first high pressure pump (1) having a flow control device (36), a steering servo motor (10) connected to the vehicle steerable wheels and having opposing pressure chambers, a reservoir (12), a return line (9) connecting said reservoir to the control valve means, a pressure line (3, 4, 14) interconnecting said control valve means with said first high pressure pump, said control valve means in the neutral position conducting flow to the metering unit (12) while blocking flow to the servo motor and responsive to displacement thereof from the neutral position for opening a flow path to the metering unit (12) while conducting flow to one of the pressure chambers of the servo motor (10) as the other of the pressure chambers is connected by the return line (9) to the reservoir (2), a first metering orifice (13) conducting flow from the first high pressure pump (1) to the metering unit (12), a first control line (15) connecting the first metering orifice (13) downstream of the first high pressure pump to said flow control device (36) controlling the flow from the first high pressure pump (1) to the control valve means (6), and a second high pressure pump (16) connected to the control valve means (6) in parallel with the first high pressure pump (1), the improvement residing in a second metering orifice (18) located in the pressure line (3, 4, 14) between the first high pressure pump (1) and the metering unit (12), a connecting line (19) interconnecting the first and second metering orifices (13, 18) downstream of the first high pressure pump, a third metering orifice (20) connected to the first metering orifice (13) downstream thereof, a check valve (21) in the connecting line (19) downstream of the second metering orifice (18) conducting pressure medium in one direction therefrom, a second control line (22) connected to the connecting line (19) between the third metering orifice (20) and the check valve (21) and flow dividing valve means (17) connected to said second control line (22) for controlling flow from the second high pressure pump (16) to the metering unit (12).

2. The combination as claimed in claim 1, wherein the first metering orifice (213) has a variable cross sectional flow area.

3. The combination as claimed in claim 2, wherein the first metering orifice (213) is located in the control valve means (206) and means for varying the first metering orifice in cross-sectional flow area in response to displacement of the control valve means (206).

* * * * *